US007359856B2

(12) United States Patent
Martin et al.

(10) Patent No.: US 7,359,856 B2
(45) Date of Patent: Apr. 15, 2008

(54) SPEECH DETECTION SYSTEM IN AN AUDIO SIGNAL IN NOISY SURROUNDING

(75) Inventors: Arnaud Martin, Brest (FR); Laurent Mauuary, Lannion (FR)

(73) Assignee: France Telecom, Paris (FR)

(*) Notice: Subject to any disclaimer, the term of this patent is extended or adjusted under 35 U.S.C. 154(b) by 381 days.

(21) Appl. No.: 10/497,874

(22) PCT Filed: Nov. 15, 2002

(86) PCT No.: PCT/FR02/03910

§ 371 (c)(1),
(2), (4) Date: Jan. 28, 2005

(87) PCT Pub. No.: WO03/048711

PCT Pub. Date: Jun. 12, 2003

(65) Prior Publication Data

US 2005/0143978 A1 Jun. 30, 2005

(30) Foreign Application Priority Data

Dec. 5, 2001 (FR) .................................. 01 15685

(51) Int. Cl.
*G10L 11/00* (2006.01)
*G10L 15/20* (2006.01)

(52) U.S. Cl. ....................... 704/226; 704/206; 704/233

(58) Field of Classification Search ................ 704/205, 704/206, 208, 210, 214, 215, 226, 233
See application file for complete search history.

(56) References Cited

U.S. PATENT DOCUMENTS

| | | | | |
|---|---|---|---|---|
| 4,696,039 | A * | 9/1987 | Doddington | 704/215 |
| 5,276,765 | A | 1/1994 | Freeman et al. | |
| 5,579,431 | A * | 11/1996 | Reaves | 704/214 |
| 5,598,466 | A * | 1/1997 | Graumann | 379/388.04 |
| 5,732,392 | A * | 3/1998 | Mizuno et al. | 704/233 |
| 5,819,217 | A * | 10/1998 | Raman | 704/233 |
| 5,890,109 | A * | 3/1999 | Walker et al. | 704/215 |
| 6,023,674 | A * | 2/2000 | Mekuria | 704/233 |
| 6,122,531 | A * | 9/2000 | Nicholls et al. | 455/570 |
| 6,327,564 | B1 * | 12/2001 | Gelin et al. | 704/233 |
| 6,775,649 | B1 * | 8/2004 | DeMartin | 704/201 |

OTHER PUBLICATIONS

Martin et al., "Robust speech/non-speech detection using LDA applied to MFCC", Proceeding IEEE International Conference on Acoustics, Speech, and Signal Processing, 2001, May 7-11, 2001, vol. 1, pp. 237 to 240.*

(Continued)

*Primary Examiner*—Martin Lerner
(74) *Attorney, Agent, or Firm*—Cohen Pontani Lieberman & Pavane LLP

(57) ABSTRACT

A method of detecting speech in an audio signal comprises a step of obtaining information on the energy of the audio signal, the energy information then being used to detect speech in the audio signal. The method further comprises a step of obtaining information on the voicing of the audio signal, the voicing information then being used in conjunction with the energy information to detect speech in the audio signal.

7 Claims, 7 Drawing Sheets

OTHER PUBLICATIONS

Rao et al., "Word boundary detection using pitch variations", Fourth International Conference on Spoken Language, 1996. ICSLP 96. Proceedings. Oct. 3-6, 1996, vol. 2, pp. 813-816.*
Martin, P., "Comparison of pitch detection by cepstrum and spectral analysis", IEEE International Conference on Acoustics, Speech, and Signal Processing, ICASSP '82, May 1982, vol. 7, pp. 180 to 183.*
Navarro-Mesa et al., "An improved speech endpoint detection system in noisy environments by means of third-order spectra", IEEE Signal Processing Letters, Sep. 1999, vol. 6, Issue 9, pp. 224 to 226.*

* cited by examiner

SPEECH DETECTION SYSTEM IN AN AUDIO SIGNAL IN NOISY SURROUNDING

RELATED APPLICATIONS

This is a U.S. national stage of International application No. PCT/FR02/03910, filed on 15 Nov. 2002.

This patent application claims the priority of French patent application No. 01/05685 filed 05 Dec. 2001, the disclosure content of which is hereby incorporated by reference.

FIELD OF THE INVENTION

The present invention relates to a system for detecting speech in an audio signal and in particular in a noisy environment.

The invention relates more particularly to a method of detecting speech in an audio signal comprising a step of obtaining information on the energy of the audio signal, which information is then used to detect speech in the audio signal. The invention also relates to a speech detection device adapted to implement this method.

BACKGROUND OF THE INVENTION

Spoken language is the most natural mode of communication for mankind. The dream of voice interaction between man and machine appeared very soon after the automation of man-machine communication.

With this aim in view, research into automatic speech recognition (voice recognition) systems began as early as the 1950s, and many technical applications now use such systems, such as direct voice-to-text dictation and interactive telephone voice services. Since the outset, technical problems associated with voice recognition have continually evolved, in particular with the expansion of telephony.

A voice recognition system conventionally comprises a speech detection module and a speech recognition module. The function of the detection module is to detect periods of speech in an input audio signal, in order to avoid the recognition module attempting to recognize speech in periods of the input signal corresponding to silence. The speech detection module therefore improves performance and also reduces the cost of the voice recognition system.

The operation of a module for detecting speech in an audio signal, usually implemented in the form of software, is conventionally represented by a finite state machine also known as an automaton.

A change of state of a detection module is typically conditioned by a criterion that is based on obtaining and processing information relating to the energy of the audio signal. A speech detection module of this kind is described in the doctoral thesis "Amélioration des performances des serveurs vocaux interactifs" ["Improving performance of interactive voice servers"] by L. Mauuary, Université de Rennes 1, 1994.

In the particular context of voice recognition for telephone applications, attention is focused at present on recognizing a large number of isolated words (for a voice directory, for example), recognizing continuous speech (i.e. phrases of everyday language), and signal transmission/reception in a noisy environment, for example in mobile telephony.

However, in this context, the performance of current detection systems remains highly inadequate, particularly when the background noise is of short duration, in which case speech detection errors can lead to voice recognition errors that are very disturbing for the user. Also, the settings of existing detection systems are highly sensitive to the conditions and the nature of the telephone call (fixed telephony, mobile telephony, etc.).

SUMMARY OF THE INVENTION

One object of the present invention is to provide a speech detection system that is more effective in a noisy context than conventional detection systems and which therefore improves the performance of an associated voice recognition system in a noisy context. The proposed detection system is therefore particularly suitable for use in the context of robust telephone voice recognition in the presence of background noise.

This and other objects are attained in accordance with one aspect of the present invention directed to a method of detecting speech in an audio signal comprising a step of obtaining information on the energy of the audio signal, said energy information then being used to detect speech in the audio signal.

According to the invention, the method further comprises a step of obtaining information on the voicing of the audio signal, said voicing information then being used in conjunction with the energy information to detect speech in the audio signal.

Another aspect of the present invention is directed to a device for detecting speech in an audio signal, comprising means for obtaining information on the energy of the audio signal, said energy information then being used to detect speech in the audio signal. According to the invention the device further comprises means for obtaining information on the voicing of the audio signal, said voicing information then being used in conjunction with the energy information to detect speech in the audio signal.

The combined use of the energy of the input signal and a voicing parameter improves speech detection by reducing noise detection and thereby improves the overall accuracy of a voice recognition system. This improvement is accompanied by a reduction in the sensitivity of the settings of the detection system to characteristics of the call.

The present invention applies to the general field of audio signal processing. In particular the invention may be applied (the following list is not comprehensive):

- to robust speech recognition given the acoustic environment, for example speech recognition in the street (mobile telephony), in motor vehicles, etc.,
- to speech transmission, for example in a telephony or teleconference/videoconference context,
- to noise reduction, and
- to automatic segmentation of databases.

DETAILED DESCRIPTION OF THE DRAWINGS

Terms employed in the field of voice recognition and used in the remainder of the description are defined below.

Voicing—A voiced sound is a sound characterized by vibration of the vocal chords. Voicing is characteristic of most speech sounds, and only certain plosive and fricative sounds are not voiced. Also, the majority of noise is not voiced. Consequently, a voicing parameter can provide useful information for discriminating between energetic speech sounds and energetic noise in an input signal.

Fundamental frequency (pitch)—The measured fundamental frequency F0 (in the Fourier analysis sense) of the speech signal appears to constitute an estimate of the frequency of vibration of the vocal chords. The fundamental frequency $F_0$ varies with the sex, age, accent, emotional state, etc. of the speaker. Its variation may range from 50 hertz (Hz) to 200 Hz.

There are various prior art methods of detecting the fundamental frequency and these methods are therefore not explained in detail in the present description. However, two general classes of method may be defined, namely time domain methods and frequency domain methods. Time domain methods generally entail calculating an autocorrelation function and frequency domain methods entail calculating a Fourier transform or a similar calculation.

Figure 1:
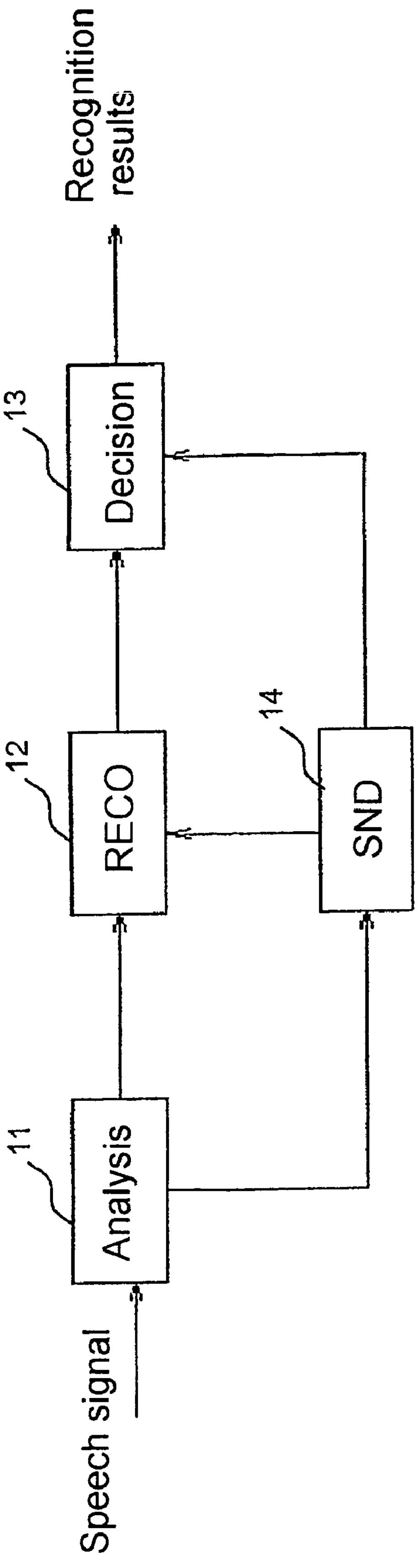
FIG. 1 represents the general structure of a voice recognition system into which the present invention may be incorporated.

One example of the general structure of a speech recognition system that may incorporate the present invention is described next with reference to FIG. 1. The recognition system represented comprises a speech/noise detection (SND) module 14 and a voice recognition (RECO) module 12.

The speech/noise detection module 14 identifies periods of the input audio signal in which speech is present.

This is preceded by the analysis of the audio signal by an analysis module 11 in order to extract therefrom pertinent coefficients for use by the detection module 14 and the recognition module 12.

In one particular embodiment, the extracted coefficients are cepstrum coefficients, also known as MFCC (Mel Frequency Cepstrum Coefficients). Also, in the example described, the detection module 14 and the recognition module 12 operate simultaneously.

Moreover, in this example, the recognition module 12 used to recognize isolated words and continuous speech is based on a prior art method using Markov chains. However, other speech recognition methods may be used in the context of the present invention.

The detection module 14 supplies start-of-speech and then end-of-speech information to the recognition module 12. When all speech frames have been processed, the speech recognition system supplies a recognition result via a decision module 13.

Systems for detecting speech in noise (known as SND systems) generally employ a finite state machine also known as an automaton. For example, a two-state automaton may be used in the simplest case (to detect voice activity, for example), or a three-state automaton, a four-state automaton or a five-state automaton.

The decision is taken at the level of each frame of the input signal, whose duration may be 16 milliseconds (ms), for example. Using an automaton having a large number of finite states generally allows more refined modeling of the decision to be taken, by taking account of speech structure considerations.

One example of a state machine (automaton) adapted to control the operation of a system for detecting speech in noise is described with reference to FIG. 2. In this detection system, changes of state take account in particular of a measurement of the energy of the input signal.

As emerges in the explanation given below with reference to FIG. 3, in a preferred embodiment of the invention, the automaton is modified by incorporating a voicing parameter into it as an additional change-of-state criterion.

In this example, the automaton is a five-state automaton described in the above-cited doctoral thesis "Amélioration des performances des serveurs vocaux interactifs" by L. Mauuary, Université de Rennes 1, 1994. Of course, other detection automata may be used in the context of the present invention.

In the example given here, the five states of the automaton are defined as follows:

state 1: "noise or silence"", state 2: "presumption of speech", state 3: "speech", state 4: "non-voiced plosive or silence", and state 5: "possible resumption of speech".

Changes from one state of the automaton to another are conditioned by a test on the energy of the input signal and by structural duration constraints (the minimum duration of a vowel and the maximum duration of a plosive).

Figure 2:
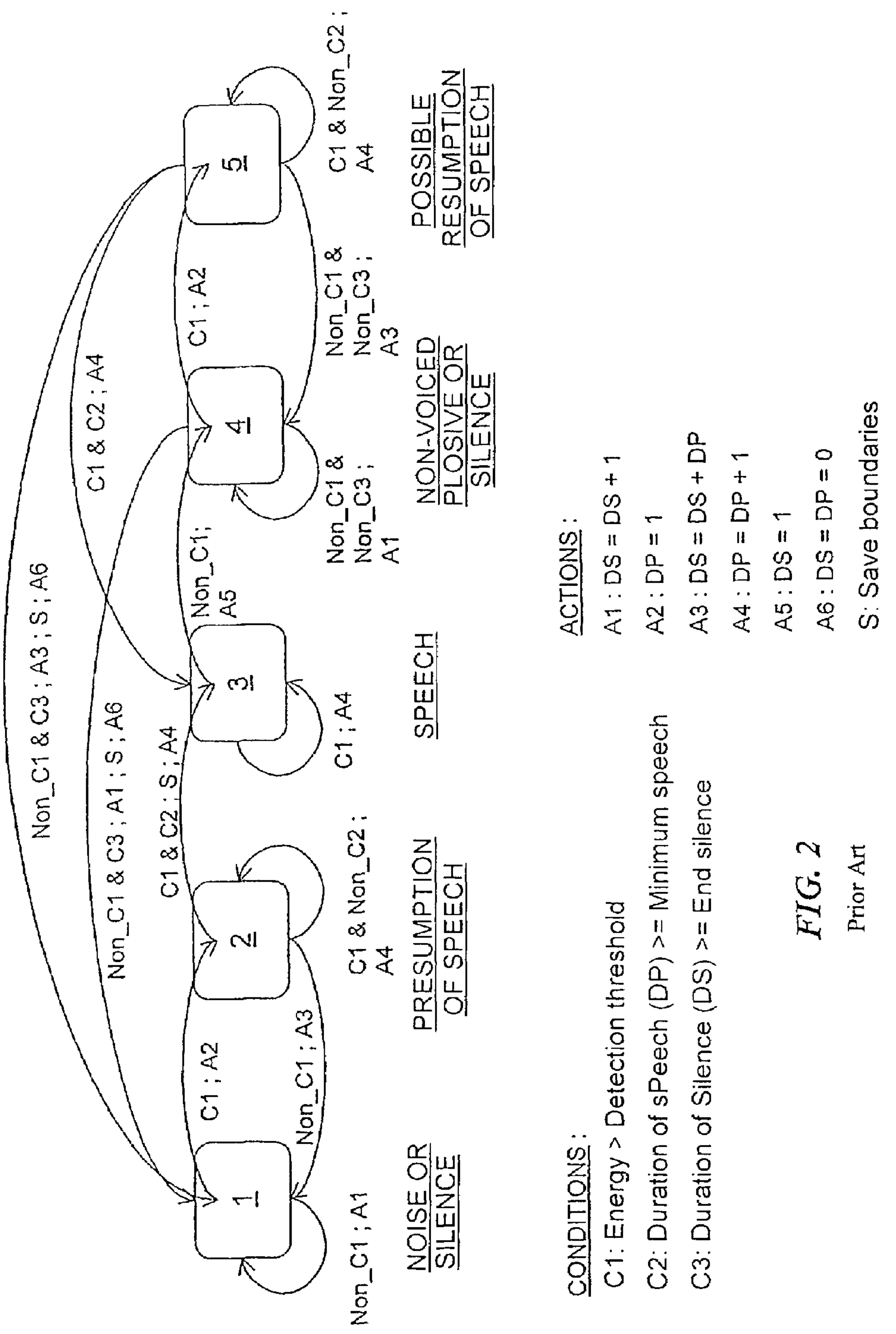
FIG. 2 Prior Art
FIG. 2 represents a state machine illustrating the operation of a prior art speech detection module.

In the example represented in FIG. 2, the change to state 3 ("speech") determines the boundary at which speech begins in the input signal. The recognition module 12 takes account of the boundary at which speech begins with a predetermined safety margin, for example 160 ms (10 frames each of 16 ms).

The return of the automaton to state 1 signifies confirmation of the end of speech. The boundary at the end of speech is therefore determined on the change of state of the automaton from state 3 or state 5 to state 1. The recognition module 12 takes into account the boundary at the end of speech with a predetermined safety margin, for example 240 ms (15 frames each of 16 ms).

State 1 "noise or silence" is the initial state of the decision algorithm, and assumes that the call begins with a frame of noise or silence. Secondly, the variables "Duration of speech" (DP) and "Duration of Silence" (DS), whose values respectively represent the duration of speech and the duration of silence, are initialized to 0.

The decision automaton remains in state 1 for as long as no energetic frame (i.e. no frame whose energy is above a predetermined detection threshold) is received (this is the condition "Non_C1").

On the reception of the first frame whose energy is above the detection threshold (condition "C1"), the automaton changes to state 2 "presumption of speech". In state 2, the reception of a "non-energetic" frame (condition "Non_C1") causes a return to state 1 "noise or silence".

The automaton changes to state 3 if conditions C1 and C2 are satisfied simultaneously, i.e. if the automaton has remained in state 2 for a predetermined minimum number ("Minimum Speech" —condition C2) of successive received energetic frames (condition C1). It then remains in state 3 ("speech") for as long as the frames are energetic (condition C1).

However, it changes to state 4 "non-voiced plosive or silence" as soon as the current frame is non-energetic (condition "Non_C1"). In state 4, the reception of a number of successive non-energetic frames (condition Non_C1) whose cumulative duration is greater than an "End Silence" variable (condition C3) confirms a state of silence and causes a return to state 1 "noise or silence".

Consequently, the "End Silence" variable confirms a state of silence resulting from the end of speech. For example, in the case of continuous speech, the value of the End Silence variable can be as much as one second.

If, in state 4 "non-voiced plosive or silence", the current frame is energetic (condition C1), the automaton changes to state 5 "possible resumption of speech".

In state 5, the reception of a non-energetic frame (condition Non_C1) causes a return to state 1 "noise or silence" or state 4 "non-voiced plosive or silence", according to whether the duration of silence (Duration of Silence—DS) is greater than a predefined number of frames (End Silence—condition C3) or not (condition Non_C3). The duration of silence represents the time spent in state 4 "non-voiced plosive or silence" and in state 5 "possible resumption of speech".

Finally, if the condition "C1&C2" is satisfied (in which "&" designates the logic operator "AND"), i.e. if the automaton has remained in state 5 ("possible resumption of speech") for a minimum number (Minimum Speech) of energetic frames, the automaton then returns to state 3 ("speech").

The three states "presumption of speech" (2), "non-voiced plosive or silence" (4) and "possible resumption of speech" (5) are used to model variations in the energy of the speech signal.

More specifically, the state "presumption of speech" (2) prevents detection of energetic impulsive noise of very short duration (a few frames). The state "non-voiced plosive or silence" (4) models passages of low energy in a word or a phrase, such as intra-word silences or plosives.

As represented in FIG. 2, a certain number of actions (A1-A6) are executed in conjunction with the conditions (C1, C2, etc.) determining a change from one state to another or retention of a given state.

Thus action A1 indicates the duration of silence after the last detected speech frame and action A6 resets the "Duration of Silence" (DS) variable used to count silences and the "Duration of speech" (DP) variable.

Executing action A3 on returning from state 5 to state 4 "non-voiced plosive or silence" gives the number of frames of silence after the last frame of speech (state 3 "speech"), used to determine the end of speech boundary. Actions A3 and A6 are executed on returning from state 5 to state 1 "noise or silence".

Actions A2 and A5 respectively set the "Duration of speech" (DP) and "Duration of Silence" (DS) variables to "1". Finally, action A4 increments the variable DP.

In the detection module whose operation is represented in FIG. 2, the change of state condition C1 is based on a detection criterion that uses information on the energy of the frames of the input signal: the energy information for a given frame of the input signal is compared to a predetermined threshold.

As explained later in connection with FIG. 4, the FIG. 1 state machine is modified in accordance with the invention to add to the condition C1 another condition C4 based on a second detection criterion using a voicing parameter.

Energy criterion (condition C1)

The speech detection system (14) includes means for measuring the energy of the input signal, used to define the energy criterion of condition C1. In one embodiment of the invention, this criterion is based on the use of noise statistics. The conventional hypothesis to the effect that the logarithm of the energy of the noise E(n) follows a normal law with parameters ($\mu$, $\sigma^2$) is applied.

In this example, E(n) is the logarithm of the short-term energy of the noise, i.e. the logarithm of the sum of the squares of the samples from a given frame n of the input signal. The statistics of the logarithm of the energy of the noise are estimated when the automaton is in state 1 "noise or silence".

The mean and the standard deviation are respectively estimated using the following equations:

$$\hat{\mu}(n)=\hat{\mu}(n-1)+(1-\lambda)(E(n)-\hat{\mu}(n-1)) \quad (1)$$

$$\hat{\sigma}(n)=\hat{\sigma}(n-1)+(1-\lambda)(|E(n)-\hat{\mu}(n-1)|-\hat{\mathbf{94}}(n-1)) \quad (2)$$

in which: $\hat{\mu}(n)$ and $\hat{\sigma}(n)$ respectively designate the estimated mean and the estimated standard deviation for the energy of the noise E(n), where n is the number of the frame and $\lambda$ is a "forgetting factor".

The above estimates are effected in state 1 of the automaton, "noise or silence". Estimation of the mean uses a value $\lambda$=0.99, for example, which corresponds to a time constant of 1600 ms. Estimation of the standard deviation uses a value $\lambda$=0.995, which corresponds to a time constant of 3200 ms.

The logarithm of the energy of each frame is considered and an attempt is made to verify the hypothesis to the effect that the automaton is in the "noise or silence" state, which corresponds to absence of speech. A decision is taken as a function of the difference between the logarithm of the energy E(n) of the frame n considered and the estimated mean of the noise, i.e. according to the value of a critical ratio r(E(n)) that is defined as follows:

$$r(E(n)) = \frac{E(n)-\hat{\mu}(n)}{\hat{\sigma}(n)} \quad (3)$$

The critical ratio is then compared to a predefined detection threshold:

$$r(E(n))>\text{detection threshold (condition C1)} \quad (4)$$

Typically threshold values from 1.5 to 3.5 may be used.

This first criterion, based on the use of energy information E(n) for the input signal, is called the "SN criterion" in the remainder of the description. Nevertheless, other criteria using energy information for the input signal may be used in the context of the present invention.

As explained above, the system of the invention for detecting speech in noise further comprises means for calculating a voicing parameter that is associated with the energy information for the purpose of detecting speech in noise. In a preferred embodiment of the invention, this parameter is calculated in the following manner.

Calculation of a Voicing parameter

The voicing parameter is estimated from the pitch (fundamental frequency). Nevertheless, other types of voicing parameter, obtained by other methods, may be used in the context of the present invention.

In the embodiment described here, the pitch is calculated using a spectral method which looks for harmonics of the signal through cross-correlation with a comb function in which the distance between the teeth of the comb is varied.

The method used is similar to that described in the document "Comparison of pitch detection by cepstrum and spectral combination analysis", P. Martin—International Conference on Acoustics, Speech, and Signal Processing, pp. 180-183—1982.

In this embodiment, the period of the harmonics in the spectrum is calculated at regular time intervals over the whole of the input signal. In a preferred implementation, the period of the harmonics in the spectrum is calculated every 4 milliseconds (ms) over the whole of the input signal, i.e. even in non-speech periods.

In voiced periods of the signal, the period of the harmonics in the spectrum is the pitch. For simplicity, the term "pitch" as used in the remainder of the description refers to the period of the harmonics in the spectrum.

In this embodiment, the median of the current pitch value and a predetermined number of preceding pitch values is then calculated. In practice, in the chosen implementation, the median is calculated between the current pitch value and the preceding two values. Using the median eliminates in particular certain errors in estimating the pitch.

Each frame n of the input signal being divided into a predefined number of sub-frames (also known as frame segments) m, a median value med(m) as defined above is calculated for each of the sub-frames m of the input signal (audio signal).

The arithmetic mean $\overline{\delta med}(m)$ of the absolute values of the differences between a current median value and the preceding median value calculated for the N sub-frames preceding the sub-frame m concerned is then calculated for each of the sub-frames m using the following equation:

$$\overline{\delta med}(m) = \frac{1}{N}\sum_{k=0}^{N-1} |med(m-k) - med(m-k-1)| \quad (5)$$

in which:

- N is (therefore) the size of the arithmetic window (for example N=1),
- med(m) is the median calculated for the sub-frame m,
- m−d (d: natural integer) designates the $d^{th}$ sub-frame preceding the current sub-frame m, and
- m=P·n+i where P defines the number of sub-frames per frame n and i=0, 1, 2, . . . , P−1.

A preferred embodiment of the invention considers successive 16 ms frames of the input signal and a median value is calculated every 4 ms, i.e. for each 4 ms sub-frame. In this embodiment m=4n+i with i=0, 1, 2, 3.

With an arithmetic window of size N equal to 1:

$$\overline{\delta med}(m) = |med(m) - med(m-1)| \quad (6)$$

This mean, calculated over the last two median values, is a criterion of local pitch variation. If the pitch does not vary greatly, the current frame is assumed to be a speech frame. The arithmetic mean $\overline{\delta med}(m)$ therefore constitutes an estimate of the degree of voicing.

Figure 3:
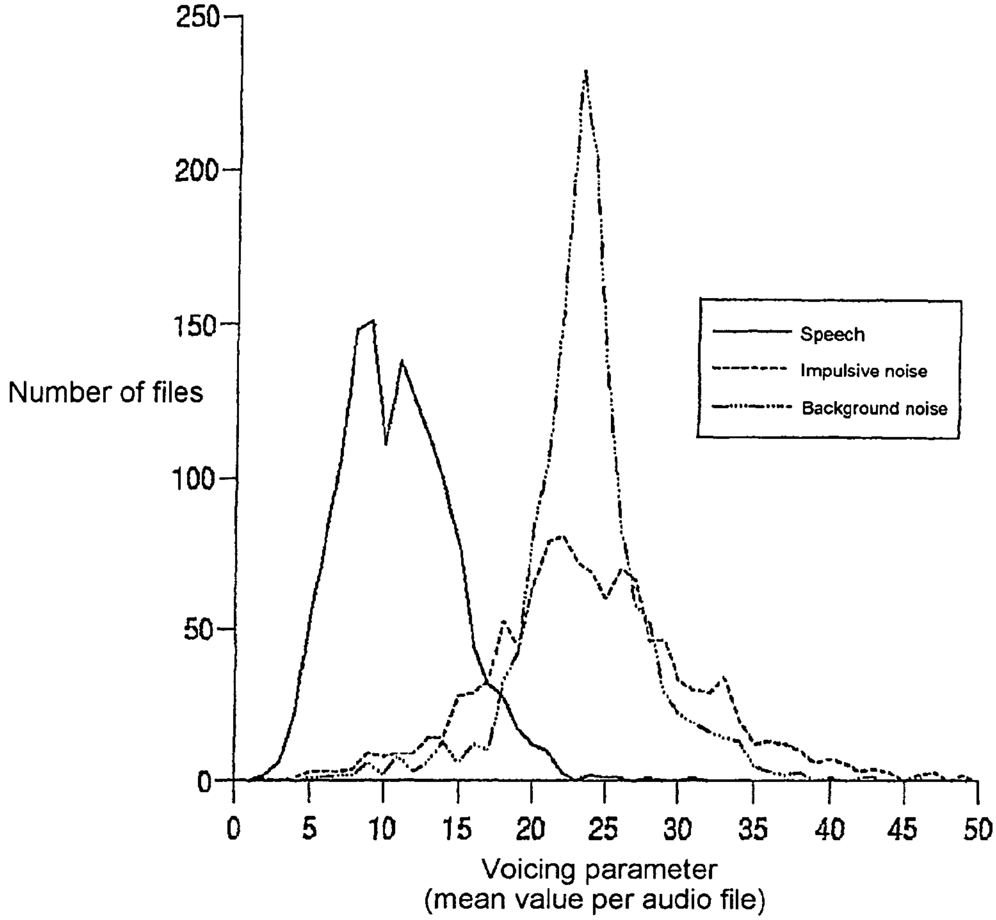
FIG. 3 is a graphical representation of the values of a voicing parameter calculated, in one embodiment of the invention, from databases of audio files obtained from public switched telephone networks and GSM networks.

FIG. 3 is a plot of curves representing the value of the voicing parameter calculated using equation (6) as a function of the number of audio files of different types (speech, impulsive noise, background noise). To be more precise, the FIG. 3 curves represent the measured mean degree of voicing obtained from databases of audio files recorded on public switched telephone networks and GSM networks.

FIG. 3 shows that the voicing parameter whose values are represented on these curves discriminates speech from impulsive noise. This is because, by applying a threshold of 15 to this parameter value, for example, it is possible to distinguish speech efficiently from impulsive noise and background noise.

The detection module (14) of the decision automaton described above with reference to FIG. 2 uses this voicing parameter in addition to the information on the energy of the input signal to discriminate speech from noise. The combined use of the energy of the input signal and the voicing parameter defines a more precise criterion for triggering transitions between some or all states of the automaton.

Figure 4:
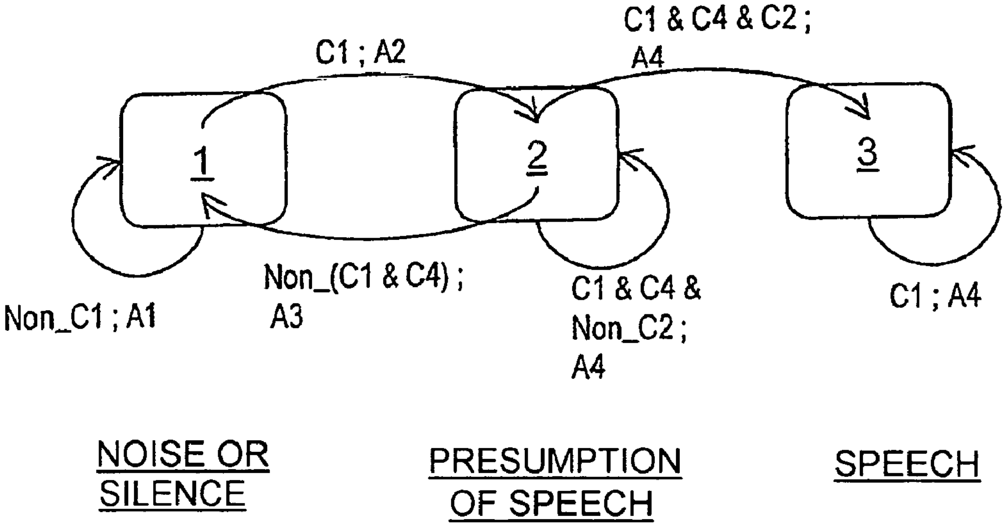
FIG. 4 depicts the use of a new detection criterion based on a voicing parameter calculated in accordance with one preferred embodiment of the invention and applied to the FIG. 2 state machine.

FIG. 4 represents, by way of example, the insertion in accordance with the invention of the above new criterion based on a voicing parameter into the FIG. 2 state machine.

Experiments carried out by the inventors have shown that, to improve speech recognition performance, the detection process must be made less sensitive to short-duration impulsive noise, and therefore that the new criterion should preferably be added at the start of the detection process.

In this regard, the present invention may therefore apply equally to detection systems whose function is to detect only the start of speech.

The best detection results have been obtained by integrating this new criterion at the level of state 2 "presumption of speech". Accordingly, FIG. 4 shows only states 1, 2 and 3, and a new condition C4 corresponding to this criterion is operative in the change from state 2 "presumption of speech" to state 3 "speech" and to state 1 "noise or silence".

In the embodiment represented in FIG. 4, condition C4 is defined as follows:

$$\overline{\delta med}(P\cdot n+3) < threshold_{\overline{\delta med}} \quad (7)$$

In this equation, $\overline{\delta med}(P\cdot n+3)$ represents, for a given frame n of the input signal, the mean value given by equation (6) corresponding to the last sub-frame (i=3).

Detection tests on a noisy portion of a database of GSM audio files have indicated that a value of "10" is the optimum value for the threshold $threshold_{\overline{\delta}}$. This threshold may be adapted to the conditions of noise present in the input signal to guarantee accurate detection regardless of the acoustic environment.

In the FIG. 2 state machine, the combination of the new condition C4 with the condition C1 therefore yields a double detection criterion based on a measurement of the energy of the input signal and a measurement of the voicing of the input signal.

As may be seen in FIG. 4, in the example described here it is possible to change from state 2 "presumption of speech" to state 3 "speech" only if conditions C1, C2 and C4 are satisfied simultaneously.

Experimental results obtained with a detection module (FIG. 1, 14) using a voicing criterion in addition to the criterion relating to the energy of the input signal are explained next with reference to FIGS. 5, 6 and 7. The results obtained with only the detection module and using a database of audio files recorded on a GSM network (FIG. 5) and a database of audio files recorded on a public switched telephone network (FIG. 6) are described first.

Finally, the results obtained using a database of audio files recorded on a public switched telephone network by a voice recognition module (FIG. 1, 12-13) when it is coupled to a speech detection module (14) of the invention are described with reference to FIG. 7.

These results were obtained using the "GSM_T" and "AGORA" databases described hereinafter.

The GSM_T database is a laboratory database recorded on a GSM network in four different environments: indoor, outdoor, stationary vehicle and moving vehicle. Normally each word is repeated only once, unless there is a loud noise during the word. The occurrences of each word are therefore substantially identical. The vocabulary comprises 65 words. The 29558 segments obtained by manual segmentation are divided into 85% words from the vocabulary, 3% words not in the vocabulary, and 12% noise. The GSM_T database comprises two sub-bases defined as a function of the signal-to-noise ratio (SNR) of each file constituting these sub-bases.

The AGORA database is an experimental database for a man-machine dialogue application recorded on a pubic switched telephone network and is therefore a continuous speech database. It is used mainly as a test base and comprises 64 recordings. The 3115 reference segments comprise 12635 words. The vocabulary of the recognition module comprises 1633 words. In this database there are no segments of words not in the vocabulary. The speech segments constitute 81% of the reference segments and the noise segments constitute 19% of the reference segments.

To evaluate the detection module (14) of the invention, the results for speech detection only are considered first, and then the results for speech detection in the context of voice recognition, by analysing the results obtained by the recognition system.

The results for detection only are considered in terms of the definitive error rate as a function of the rejectable error rate.

The definitive errors generated by the detection module comprise missing speech, fragmented words or phrases and lumping of a plurality of words or phrases. These errors are called "definitive" because they cause definitive recognition module errors.

The rejectable errors generated by the detection module comprise insertion (or detection) of noise. A rejectable error may be rejected by a rejection model incorporated into the decision module (FIG. 1, 13) of the recognition module. Otherwise, it causes a voice recognition error.

By evaluating only the detection module, this approach provides a context independent of voice recognition.

The results for a recognition system using a detection module of the invention are considered with reference to three types of error in the case of recognition of isolated words and four types of error in the case of recognition of continuous speech.

In the case of recognition of isolated words, a "substitution" error represents a word from the vocabulary that is recognized as being a different word from the vocabulary. A "false acceptance" error represents noise that is detected as a word. A "wrongful rejection" error corresponds to a word from the vocabulary that is rejected by the rejection model or a word that is not detected by the detection module. To simplify the description, the weighted sum of substitution errors and false acceptance errors as a function of wrongful rejection errors is evaluated.

In the case of continuous speech recognition, an "insertion" error corresponds to a word inserted into a phrase (or request), an "omission" error corresponds to a word omitted from a phrase, a "substitution" error corresponds to a word substituted in a phrase, and a "wrongful rejection" error corresponds to a phrase that is wrongfully rejected by the rejection model or that is not detected by the detection module. These wrongful rejection errors are expressed by a rate of omission of words in phrases. Insertion, omission and substitution errors are represented as a function of wrongful rejection errors.

Figure 5:
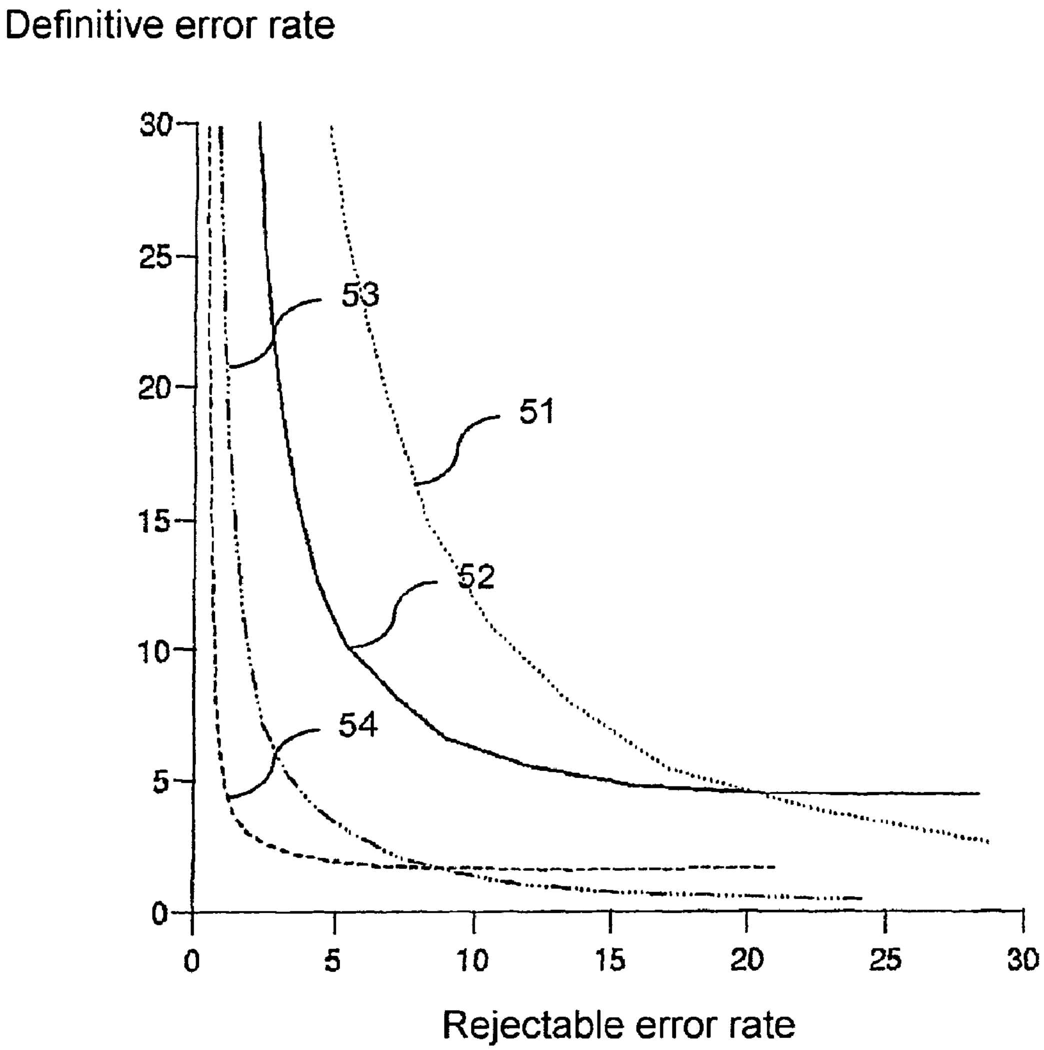
FIG. 5 is a graphical representation of the results obtained by a detection module of the invention on a database of audio files recorded on a GSM network.

FIG. 5 is a graphical representation of the results obtained by a detection module conforming to the invention using the GSM_T database of audio files recorded on a GSM network.

The FIG. 5 curves represent, for each noisy and non-noisy sub-base of the GSM_T base, the results obtained using the FIG. 2 detection automaton (condition C1 only) and the results obtained using the FIG. 4 modified detection automaton (combination of conditions C1 and C4). The results are expressed in rejectable error rate relative to the definitive error rate. For a given rejectable error rate, the performance obtained is inversely proportional to the definitive error rate.

Thus the curves 51 and 52 correspond to results obtained with the "non-noisy" sub-base, i.e. for a signal-to-noise ratio (SNR) greater than 18 decibels (dB). The curves 53 and 54 correspond to results obtained with the "noisy" sub-base, i.e. for a signal-to-noise ratio less than 18 dB.

The curves 51 and 53 correspond to using only the "energy" criterion based on the energy of the input signal (condition C1) and the curves 52, 54 correspond to the use of the combined energy and voicing criterion (conditions C1 and C4).

As may be seen in FIG. 5, better results are obtained for both sub-bases by using the combined energy-voicing criterion (curves 52, 54).

Figure 6:
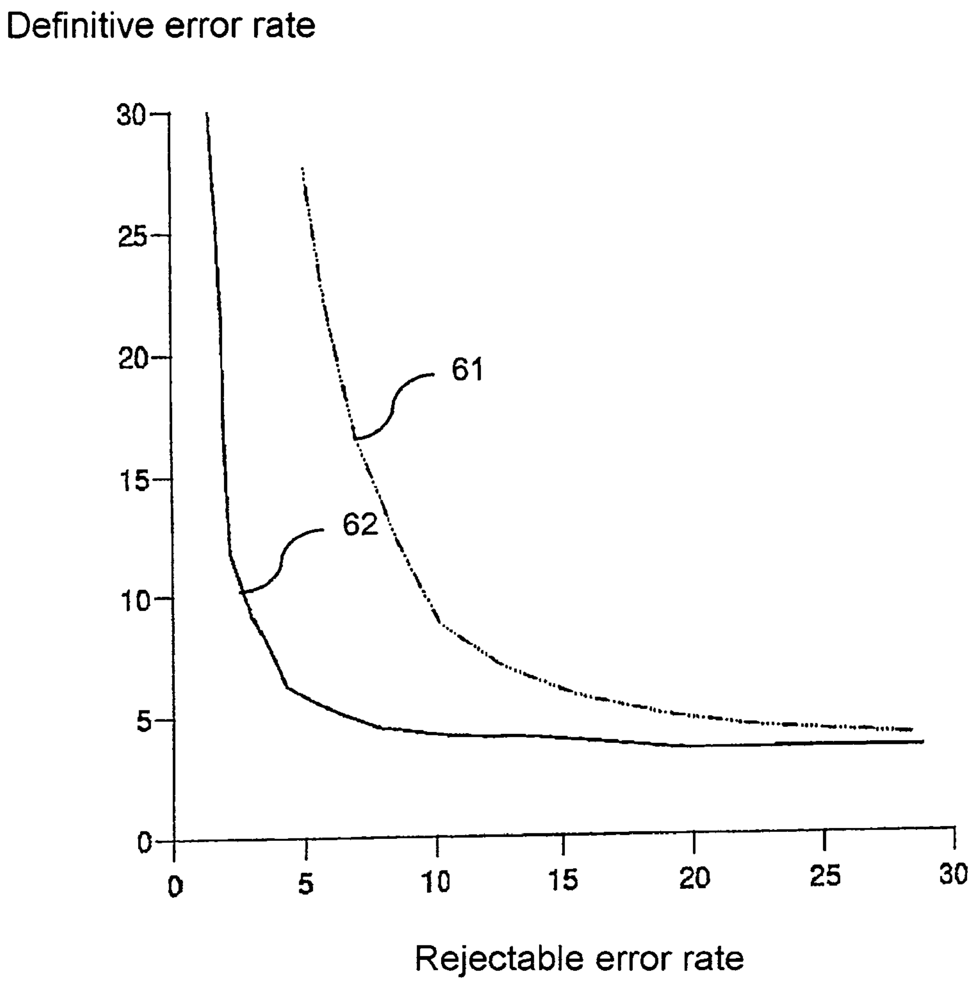
FIG. 6 is a graphical representation of the results obtained by a detection module of the invention on a database of audio files recorded on a public switched telephone network.

FIG. 6 represents the results obtained with a detection module conforming to the invention using the AGORA continuous speech database of audio files recorded on a public switched telephone network.

In FIG. 6, the curve 61 represents the results obtained using only the energy criterion (condition C1) and the curve 62 represents the results obtained using the combined energy and voicing criterion (conditions C1 and C4). Again, note that the results are significantly better when using the combined energy-voicing criterion (curve 62).

Figure 7:
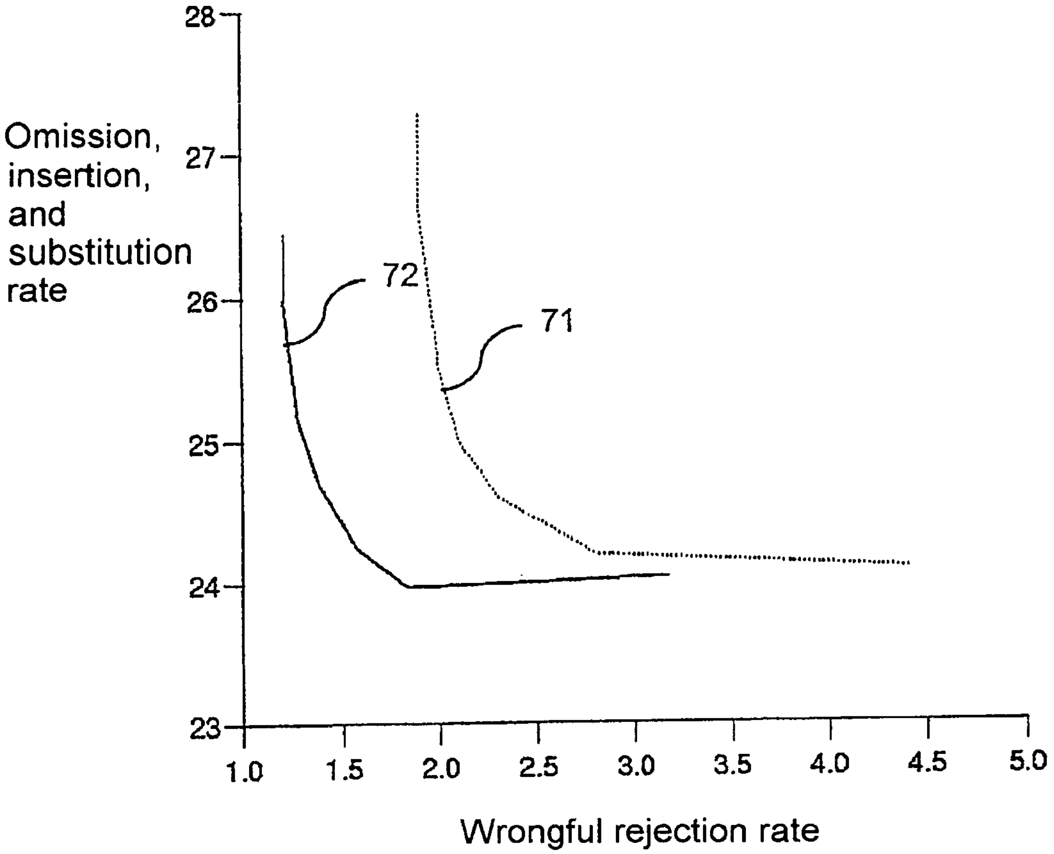
FIG. 7 is a graphical representation of the results obtained by a voice recognition system integrating a speech detection module of the invention on a database of audio files recorded on a public switched telephone network.

FIG. 7 is a graphical representation of the results obtained by a voice recognition system integrating a speech detection module of the invention using the AGORA database of audio files recorded on a public switched telephone network. These results were obtained using the optimum recognition thresholds.

For recognition, the results are assessed by comparing the wrongful rejection error rate with the omission, insertion and substitution of words error rate.

In FIG. 7, the curve 71 represents the results obtained using only the energy criterion (condition C1) and the curve 72 represents the results obtained using the combined energy and voicing criterion (conditions C1 and C4).

Note that better voice recognition results (curve 72) are again obtained by using the combined energy-voicing criterion for the detection module.

Of course, the present invention is no way limited to the embodiments described here, but to the contrary encompasses any variants that may be evident to the person skilled in the art.

The invention claimed is:

1. A method of detecting speech in an audio signal, the method comprising a step of obtaining information on the energy of the audio signal and a step of obtaining information on the voicing of the audio signal from fundamental frequency values calculated periodically over the whole of the audio signal, said voicing information then being used in conjunction with the energy information to detect speech in the audio signal, wherein the audio signal is made up of successive frames n each sub-divided into P sub-frames m, where m=P·n+i with i varying from 0 to P−1, and the step of obtaining said voicing information comprises the following sub-steps:

calculating for each sub-frame m the median value med (m) of a predetermined number of fundamental frequency values of the audio signal, calculating for each sub-frame m the arithmetic mean $\overline{\delta med}(m)$ of the absolute values of the differences between a current median value and the preceding median value, said differences being calculated for the N sub-frames preceding the current sub-frame m, and said arithmetic mean being obtained from the following equation:

$$\overline{\delta med}(m) = \frac{1}{N}\sum_{k=0}^{N-1} |med(m-k) - med(m-k-1)|$$

in which N is the size of the arithmetic window, med(m) is the median value calculated for the sub-frame m, m−d (where d is natural integer) designates the $d^{th}$ sub-frame preceding the current sub-frame m, and $m=P\cdot n+i$ with i=0, 1, 2, . . . , P−1, said voicing information calculated over the whole of the audio signal consisting of said arithmetic means $\overline{\delta med}(m)$, each of which constitutes a voicing parameter indicative of the degree of voicing of the audio signal for the sub-frame m concerned.

2. A method according to claim 1, wherein said information on the energy of the audio signal is obtained for each frame of the audio signal by calculating the logarithm of the sum of the amplitudes squared of the samples of the frame concerned.

3. A method according to claim 1, wherein the speech detection operation involves the combined use of two detection criteria comprising a first criterion based on said information on the energy of the audio signal and a second criterion based on said information on the voicing of the audio signal, and in that said second detection criterion is based, for each sub-frame m of the audio signal, on comparing the voicing parameter $\overline{\delta med}(m)$ associated with the sub-frame m with a predetermined voicing threshold.

4. A method according to claim 3, wherein the first detection criterion determines the energetic character of a frame of the audio signal and is determined by comparing the value of a critical ratio to a predetermined threshold, the critical ratio being obtained from the following equation:

$$r(E(n)) = \frac{E(n) - \hat{\mu}(n)}{\hat{\sigma}(n)}$$

in which μ(n) and σ(n) respectively designate the estimated mean and standard deviation for the energy of the noise E(n) and n is the number of the frame.

5. A method according to claim 3, wherein the first and second detection criteria are used in a finite state machine comprising at least the following three states: "noise or silence", "presumption of speech", "speech", as a function of the result of detection of speech in the audio signal, the change from one of the above three states to another being determined by the results of evaluating said first and second criteria.

6. A device for detecting speech in an audio signal, the device comprising means for obtaining information on the energy of the audio signal and means for obtaining information on the voicing of the audio signal from fundamental frequency values calculated periodically over the whole of the audio signal, said voicing information then being used in conjunction with the energy information to detect speech in the audio signal, wherein the audio signal is made up of successive frames n each sub-divided into P sub-frames m, where m=P·n+i with i varying from 0 to P−1, and the means for obtaining said voicing information comprises:

means for calculating for each sub-frame m the median value med(m) of a predetermined number of fundamental frequency values of the audio signal, means for calculating for each sub-frame m the arithmetic mean $\overline{\delta med}(m)$ of the absolute values of the differences between a current median value and the preceding median value, said differences being calculated for the N sub-frames preceding the current sub-frame m, and said arithmetic mean being obtained from the following equation:

$$\overline{\delta med}(m) = \frac{1}{N}\sum_{k=0}^{N-1} |med(m-k) - med(m-k-1)|$$

in which N is the size of the arithmetic window, med(m) is the median value calculated for the sub-frame m, m−d (where d is natural integer) designates the $d^{th}$ sub-frame preceding the current sub-frame m, and $m=P\cdot n+i$ with $i$ =0, 1, 2, . . . , $P$−1, said voicing information calculated over the whole of the audio signal consisting of said arithmetic means $\overline{\delta med}(m)$, each of which constitutes a voicing parameter indicative of the degree of voicing of the audio signal for the sub-frame m concerned.

7. A voice recognition device, the device comprising a speech detection device according to claim 6.

* * * * *